US011578203B2

(12) United States Patent
Cho et al.

(10) Patent No.: US 11,578,203 B2
(45) Date of Patent: Feb. 14, 2023

(54) COMPOSITION FOR RADAR PENETRATION COVER OF VEHICLE

(71) Applicants: Hyundai Motor Company, Seoul (KR); Kia Motors Corporation, Seoul (KR); Samyang Corporation, Seoul (KR)

(72) Inventors: Byung Kyu Cho, Seoul (KR); Seung Chan Hong, Gyeonggi-do (KR); Ho Bin Shon, Daejeon (KR); Ki Yong Kim, Daejeon (KR); Nung Hyun Kim, Daejeon (KR)

(73) Assignees: Hyundai Motor Company, Seoul (KR); Kia Motors Corporation, Seoul (KR); Samyang Corporation, Seoul (KR)

( * ) Notice: Subject to any disclaimer, the term of this patent is extended or adjusted under 35 U.S.C. 154(b) by 330 days.

(21) Appl. No.: 17/028,583

(22) Filed: Sep. 22, 2020

(65) Prior Publication Data

US 2021/0332230 A1      Oct. 28, 2021

(30) Foreign Application Priority Data

Apr. 28, 2020   (KR) .................. 10-2020-0051790

(51) Int. Cl.
| | |
|---|---|
| *C08L 67/02* | (2006.01) |
| *C08L 69/00* | (2006.01) |
| *C08L 23/10* | (2006.01) |
| *C08L 51/06* | (2006.01) |
| *C08L 23/26* | (2006.01) |

(Continued)

(52) U.S. Cl.
CPC ............... *C08L 67/02* (2013.01); *G01S 7/02* (2013.01); *G01S 13/931* (2013.01); *C08K 3/40* (2013.01); *C08K 7/14* (2013.01); *C08L 23/10* (2013.01); *C08L 23/26* (2013.01); *C08L 51/06* (2013.01); *C08L 69/00* (2013.01); *C08L 2205/03* (2013.01); *G01S 7/027* (2021.05)

(58) Field of Classification Search
None
See application file for complete search history.

(56) References Cited

U.S. PATENT DOCUMENTS

| | | | |
|---|---|---|---|
| 9,957,388 | B2 | 5/2018 | Yamanaka et al. |
| 11,098,190 | B2 | 8/2021 | Yoshida et al. |

(Continued)

FOREIGN PATENT DOCUMENTS

| | | | | |
|---|---|---|---|---|
| CN | 105440449 A | * | 3/2016 | ............. C08L 23/12 |
| JP | 5312537 B2 | | 7/2013 | |

(Continued)

*Primary Examiner* — Richard A Huhn
(74) *Attorney, Agent, or Firm* — Fox Rothschild LLP

(57) ABSTRACT

Disclosed are a composition for a radar penetration cover of a vehicle which may improve dielectric properties while maintaining excellent mechanical physical properties, and the radar penetration cover including the same.

The composition for a radar penetration cover includes: an amount of about 60 to 70 wt % of polybutylene terephthalate (PBT), an amount of about 10 to 20 wt % of polycarbonate (PC), and an amount of about 11.5 to 27.8 wt % of an additive including polypropylene (PP) having maleic anhydride (MAH) grafted to an end group and a glass fiber (GF), wt % based on the total weight of the composition.

9 Claims, 2 Drawing Sheets

| | Classification | | 1 | 2 | 3 | 4 | 5 | 6 | 7 | 8 | 9 |
|---|---|---|---|---|---|---|---|---|---|---|---|
| Material composition | PBT | | 66.2 | 64.6 | 63 | 41.9 | 67.8 | 67 | 61.4 | 64.6 | 64.6 |
| | PC | | 16.6 | 16.2 | 15.8 | 0 | 17 | 16.8 | 15.4 | 16.2 | 16.2 |
| | ASA | | 0 | 0 | 0 | 20.9 | 0 | 0 | 0 | 0 | 0 |
| | PET | | 0 | 0 | 0 | 7 | 0 | 0 | 0 | 0 | 0 |
| | GF | | 15 | 15 | 15 | 30 | 15 | 15 | 15 | 15 | 15 |
| | PP-MAH | | 2 | 4 | 6 | 0 | 0 | 1 | 8 | 0 | 0 |
| | EPDM-MAH | | 0 | 0 | 0 | 0 | 0 | 0 | 0 | 4 | 0 |
| | Ethylene butyl acrylate-GMA | | 0 | 0 | 0 | 0 | 0 | 0 | 0 | 0 | 4 |
| | Acryl rubber | | 0 | 0 | 0 | Added | 0 | 0 | 0 | 0 | 0 |
| | Carbon black | | 0.2 | 0.2 | 0.2 | 0.2 | 0.2 | 0.2 | 0.2 | 0.2 | 0.2 |
| Evaluated physical properties | Dielectric constant | | 3.07 | 3.05 | 3.01 | 3.5 | 3.07 | 3 | 2.94 | 3.01 | 3.01 |
| | Dielectric loss | | 0.0078 | 0.0075 | 0.0074 | 0.012 | 0.0077 | 0.0078 | 0.0073 | 0.0081 | 0.009 |
| | IZOD impact strength | | 9.6 | 11.3 | 12.5 | 7.8 | 7.2 | 7.5 | 13.1 | 7.3 | 10.7 |
| | Ball drop test | RT | OK | OK | OK | NG | OK | OK | OK | OK | OK |
| | | -30°C | OK | OK | OK | NG | NG | NG | OK | NG | OK |
| | HDT thermal decomposition temperature | | 153 | 145 | 142 | 200 | 170 | 150 | 125 | 147 | 145 |

(51) Int. Cl.
    *C08K 7/14*     (2006.01)
    *G01S 7/02*     (2006.01)
    *G01S 13/931*     (2020.01)
    *C08K 3/40*     (2006.01)

(56) References Cited

U.S. PATENT DOCUMENTS

| | | | |
|---|---|---|---|
| 11,332,611 B2* | 5/2022 | Cho | ............... C08L 67/02 |
| 2009/0326110 A1 | 12/2009 | Tanaka et al. | |
| 2011/0092616 A1 | 4/2011 | Sakata et al. | |
| 2015/0353732 A1* | 12/2015 | Wang | ............... C08L 23/26 |
| | | | 524/588 |
| 2017/0190884 A1 | 7/2017 | Yun et al. | |

FOREIGN PATENT DOCUMENTS

| | | |
|---|---|---|
| KR | 2003-0069495 A | 8/2003 |
| KR | 100607405 B1 | 8/2006 |
| KR | 100957092 B1 | 5/2010 |

* cited by examiner

FIG. 1

| Classification | | 1 | 2 | 3 | 4 | 5 | 6 | 7 | 8 | 9 |
|---|---|---|---|---|---|---|---|---|---|---|
| Material composition | PBT | 66.2 | 64.6 | 63 | 41.9 | 67.8 | 67 | 61.4 | 64.6 | 64.6 |
| | PC | 16.6 | 16.2 | 15.8 | 0 | 17 | 16.8 | 15.4 | 16.2 | 16.2 |
| | ASA | 0 | 0 | 0 | 20.9 | 0 | 0 | 0 | 0 | 0 |
| | PET | 0 | 0 | 0 | 7 | 0 | 0 | 0 | 0 | 0 |
| | GF | 15 | 15 | 15 | 30 | 15 | 15 | 15 | 15 | 15 |
| | PP-MAH | 2 | 4 | 6 | 0 | 0 | 1 | 8 | 0 | 0 |
| | EPDM-MAH | 0 | 0 | 0 | 0 | 0 | 0 | 0 | 4 | 0 |
| | Ethylene butyl acrylate-GMA | 0 | 0 | 0 | Added | 0 | 0 | 0 | 0 | 4 |
| | Acryl rubber | 0 | 0 | 0 | 0 | 0 | 0 | 0 | 0 | 0 |
| | Carbon black | 0.2 | 0.2 | 0.2 | 0.2 | 0.2 | 0.2 | 0.2 | 0.2 | 0.2 |
| Evaluated physical properties | Dielectric constant | 3.07 | 3.05 | 3.01 | 3.5 | 3.07 | 3 | 2.94 | 3.01 | 3.01 |
| | Dielectric loss | 0.0078 | 0.0075 | 0.0074 | 0.012 | 0.0077 | 0.0078 | 0.0073 | 0.0081 | 0.009 |
| | IZOD impact strength | 9.6 | 11.3 | 12.5 | 7.8 | 7.2 | 7.5 | 13.1 | 7.3 | 10.7 |
| | Ball drop test RT | OK | OK | OK | NG | OK | OK | OK | OK | OK |
| | Ball drop test -30°C | OK | OK | OK | NG | NG | NG | OK | NG | OK |
| | HDT thermal decomposition temperature | 153 | 145 | 142 | 200 | 170 | 150 | 125 | 147 | 145 |

FIG. 2

| Classification | | | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|
| Material composition | PBT | | 64.6 | 64.6 | 64.6 | 64.6 | 64.6 | 64.6 | 64.6 | 64.6 | 64.6 | 64.5 | 64.3 | 64.2 | 64 | 64.7 |
| | PC | | 16.15 | 16.2 | 16.15 | 16.15 | 16.15 | 16.15 | 16.15 | 16.15 | 16.2 | 16.1 | 16.1 | 16 | 16 | 16.2 |
| | PP-MAH end group | | 4 | 4 | 4 | 4 | 4 | 4 | 4 | 4 | 4 | 4 | 4 | 4 | 4 | 4 |
| | Carbon black | Content | 0.25 | 0.2 | 0.25 | 0.25 | 0.25 | 0.25 | 0.25 | 0.25 | 0.2 | 0.4 | 0.6 | 0.8 | 1 | 0.1 |
| | | Particle size(nm) | 30 | 30 | 30 | 10 | 50 | 30 | 30 | 30 | 30 | 30 | 30 | 30 | 30 | 30 |
| | Glass fiber content | | 15 | 15 | 15 | 15 | 15 | 15 | 15 | 15 | 15 | 15 | 15 | 15 | 15 | 15 |
| | Detailed glass fiber component fraction (%) | SiO₂ | 68 | 73.5 | 73.5 | 73.5 | 73.5 | 54 | 58.5 | 63 | 54 | 73.5 | 73.5 | 73.5 | 73.5 | 73.5 |
| | | Al₂O₃ | 3.5 | 0 | 0 | 0 | 0 | 14 | 10 | 7 | 14 | 0 | 0 | 0 | 0 | 0 |
| | | B₂O₃ | 19 | 23 | 23 | 23 | 23 | 7.5 | 11 | 15 | 7.5 | 23 | 23 | 23 | 23 | 23 |
| | | Other members | 9.5 | 3.5 | 3.5 | 3.5 | 3.5 | 24.5 | 20.5 | 15 | 24.5 | 3.5 | 3.5 | 3.5 | 3.5 | 3.5 |
| Evaluated physical properties | Dielectric constant | | 3.03 | 3.02 | 3 | 3.02 | 3.01 | 3.16 | 3.15 | 3.12 | 3.16 | 3.1 | 3.15 | 3.23 | 3.26 | 3.01 |
| | Dielectric loss | | 0.0078 | 0.0075 | 0.0075 | 0.0073 | 0.0077 | 0.0083 | 0.0081 | 0.0082 | 0.0085 | 0.0083 | 0.011 | 0.012 | 0.015 | 0.0074 |
| | IZOD impact strength | | 11 | 11 | 11.3 | 11.5 | 11.1 | 10.7 | 11.2 | 11.4 | 7.1 | 11.1 | 11.2 | 11.3 | 11.3 | 11.2 |
| | Ball drop test | RT | OK | OK | OK | OK | OK | OK | OK | OK | OK | OK | OK | OK | OK | OK |
| | | -30°C | OK | OK | OK | OK | NG | OK | OK | OK | NG | OK | OK | OK | OK | OK |
| | Thermal deformation temperature | | 145 | 145 | 143 | 143 | 143 | 144 | 145 | 143 | 172 | 145 | 144 | 145 | 145 | 145 |
| | Light fastness | | OK | OK | OK | OK | NG | OK | OK | OK | OK | OK | OK | OK | OK | NG |

COMPOSITION FOR RADAR PENETRATION COVER OF VEHICLE

CROSS REFERENCE TO RELATED APPLICATION

The present application claims priority to Korean Patent Application No. 10-2020-0051790, filed Apr. 28, 2020, the entire contents of which is incorporated herein for all purposes by this reference.

TECHNICAL FIELD

The present invention relates to a composition for a radar penetration cover of a vehicle, and a radar penetration cover including the same. The composition may improve dielectric properties while maintaining excellent mechanical physical properties.

BACKGROUND

Recently, a demand for radar technology for a vehicle which allows autonomous driving of a car is increased. A representative example to which the radar technology in a vehicle is applied includes a smart cruise system.

A smart cruise system refers to a system in which motion of a preceding vehicle is detected by a radar mounted on a front of a vehicle, and an engine and a brake are controlled as such, thereby avoiding the preceding vehicle to change a lane, or when there is no preceding vehicle, allowing acceleration to an initially set speed again and then driving at a fixed speed.

In order to implement the smart cruise system, a radar device is mounted on a vehicle, and information on the motion of a preceding vehicle and change of surrounding environment is collected by transmitting and receiving of a radar beam emitted from a radar.

In general, a radar device includes an antenna for transmitting and receiving a radar beam, internal electronic components such as a radio frequency integrated circuit (RFIC), and a radome for protecting the components. In addition, a cover for covering the radar device is disposed on a front of the radome.

A penetration cover which covers a front of a radar module such as a radome and a cover requires to have sufficient stiffness for protection from external environment so that the internal components such as an antenna inside the radar work normally, and has a requirement to minimize a penetration loss at the time of penetration of a radar beam emitted from the antenna.

In addition, the penetration cover should be manufactured using a stabilized material which does not chemically react from chemical components such as an automotive engine oil, gasoline, and ethanol/alcohol.

Generally, as a conventional material for manufacturing a penetration cover which covers the front of the radar module such as radome and a cover, a glass fiber (GF) mixed as a reinforcing filler in a PBT-based main material is used. However, as the content of the glass fiber (GF) mixed as a reinforcing filler is increased, mechanical physical properties of a required material are increased, but dielectric properties which influence radar penetration performance are deteriorated, and thus, the glass fiber has a trade-off relationship.

In addition, in the case of a radome through which a radar beam emitted from an antenna primarily penetrates, when a radome dimension is distorted, a phase difference of the emitted radar beam occurs, thereby causing a beam distortion phenomenon in which a beam pattern is distorted.

Meanwhile, since the beam distortion phenomenon may not be supplemented only by a PBT-based main material with a glass fiber as a reinforcing filler, occurrence of the beam distortion phenomenon is prevented by further mixing an ASA material with the main material.

However, an acryl rubber for forming the ASA material is a component which deteriorates dielectric properties and has poor radar penetration performance, thereby shortening a beam detection distance.

The contents described as the related art have been provided only to assist in understanding the background of the present invention and should not be considered as corresponding to the related art known to those having ordinary skill in the art.

SUMMARY

In preferred aspects, provided is a composition for radar penetration cover of a vehicle which may improve dielectric properties while maintaining excellent mechanical physical properties, and a radar penetration cover including the same. In one preferred aspect, the composition may have improved the mechanical physical properties by adjusting components and decreasing a use amount of a component which deteriorates dielectric properties.

In an aspect, provided is a composition for a radar penetration cover of a vehicle ("composition"). The composition may suitably include: an amount of about 60 to 70 wt % of polybutylene terephthalate (PBT), an amount of about 10 to 20 wt % of polycarbonate (PC), and an amount of about 11.5 to 27.8 wt % of an additive including i) polypropylene (PP) having maleic anhydride (MAH) grafted to an end group and ii) a glass fiber (GF). Wt % are based on the total weight of the composition.

A term "glass fiber" as used herein suitably refers to a material in a form of filaments or fibers. Exemplary glass filaments and glass fibers may form a composite of glass with non-glass materials, for example such as glass-polyester blends or glass-olefin composites (e.g. Twintex®, St. Gobain Corporation) and other olefin coated C or E glass fibers and fabrics. In addition, a "glass" can be considered an inorganic product of fusion that has cooled to a rigid condition without crystallizing. For instance, a glass fiber suitably may be spun from an inorganic product of fusion that has cooled to a rigid condition without crystallizing.

In certain embodiments, the additive may further include carbon black.

In certain preferred embodiments, the additive may suitably include an amount of about 1.5 to 7.5 wt % of the polypropylene (PP) having maleic anhydride (MAH) grafted to the end group, an amount of about 10 to 20 wt % of the glass fiber (GF), and an amount of about 0.15 to 0.3 wt % of the carbon black, based on the total weight of the composition.

In certain embodiments, the glass fiber (GF) may suitably include an amount of about 55 to 75 wt % of $SiO_2$, an amount of about 15 to 25 wt % of $B_2O_3$, and an amount of about 1 to 25 wt % of metal components, based on the total weight of the glass fiber.

The term "metal component(s)" as used herein refers to a compound or component including one or more metal elements (e.g., transition metal, rare earth metal, alkali earth metal, or alkali metal) as being complexed with non-metal elements (e.g., O, halogen, C, N, or combinations thereof).

Exemplary metal components may suitably include metal oxides, metal nitrides, or metal carbide, or particularly metal oxides.

The metal components may suitably include one or more components selected from the group consisting of $Al_2O_3$, CaO, MgO, $Li_2O$, $Na_2O$, $K_2O$, $TiO_2$, and $Fe_2O_3$.

When the metal components includes $Al_2O_3$, the content thereof may be about 7 wt % or less based on the total weight of the glass fiber.

The carbon black may have a size of about 20 to 40 nm.

Further provided is a radar penetration cover of a vehicle that may include the composition as described herein.

Also provided is a vehicle including the radar penetration cover as described herein.

Other aspects of the invention are discussed infra.

BRIEF DESCRIPTION OF THE DRAWINGS

FIGS. 1 and 2 show components, compositions, evaluation values of contents, and physical properties of the Examples according to exemplary embodiments of the present invention and the Comparative Examples.

DETAILED DESCRIPTION OF THE EMBODIMENTS

Hereinafter, exemplary embodiments of the present invention will be described in detail with reference to the accompanying drawings. However, the present invention is not limited to the exemplary embodiments disclosed below, but will be implemented in various forms. The exemplary embodiments of the present invention make invention of the present invention thorough and are provided so that those skilled in the art can completely understand the scope of the present invention.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In an aspect, provided is a composition for radar penetration cover of a vehicle, e.g., by forming the radar penetration cover of a vehicle through which a radar beam emitted from a radar penetrates. For example, the composition may be applied to production of a cover member through which a radar beam penetrates, such as a radome and a front cover which may be applied to a radar device of a vehicle.

Meanwhile, the composition for a radar penetration cover of a vehicle may suitably include a mixture of polybutylene terephthalate (PBT), polycarbonate (PC), and an additive.

The polybutylene terephthalate (PBT) and polycarbonate (PC) are main materials for maintaining an entire shape and physical properties of the penetration cover, and the additive may be a component in which the component and the content thereof are adjusted for improving mechanical physical properties and dielectric properties of the penetration cover.

Preferably, the composition may suitably include an amount of about 60 to 70 wt % of polybutylene terephthalate (PBT), an amount of about 10 to 20 wt % of polycarbonate (PC), and an amount of about 11.5 to 27.8 wt % of an additive, based on the total weight of the composition.

In particular, the sum of the contents of polybutylene terephthalate (PBT) and polycarbonate (PC) forming the main material may be about 70 to 90 wt %. Thus, the content of polybutylene terephthalate (PBT) may be linked to the content of polycarbonate (PC).

When the content of polycarbonate (PC) is less than about 10 wt %, dimensional stability to exhibit radar performance may not be secured, and when the content of polycarbonate (PC) is greater than about 20 wt %, it may react with a chemical material such as ethanol to cause discoloration and physical property deterioration.

The polybutylene terephthalate (PBT) and polycarbonate (PC) may suitably be used as a component for forming the main material instead of using acrylonitrile-styrene-acrylate (ASA) and polyethylene terephthalate (PET) for securing mechanical physical properties and dimensional stability. For example, although ASA and PET may improve mechanical physical properties, these polymers may deteriorate dielectric properties as the components of the main material.

Further, for securing a larger area and a degree of arrangement freedom of the penetration cover, polypropylene (PP) having maleic anhydride (MAH) grafted to the end group may suitably be used to improve impact resistance. Further, a glass fiber may be used as the additive, for maintaining excellent stiffness of the penetration cover. The sum of maleic anhydride (MAH)-grafted polypropylene (PP) and the glass fiber included in the additive may be an amount of about 11.5 to 27.8 wt %, or particularly of about 17.0 to 22.0 wt % based on the total weight of the composition.

Further, the composition may further include carbon black for improving light fastness.

The additive may suitably include an amount of about 1.5 to 7.5 wt % of polypropylene (PP) having maleic anhydride (MAH) grafted to the end group, an amount of about 10 to 20 wt % of a glass fiber (GF), and an amount of about 0.15 to 0.3 wt % of carbon black, based on the total weight of the composition. For example, the additive may include an amount of about 2.0 to 7.0 wt %, or particularly, an amount of about 2.0 to 6.0 wt % of maleic anhydride-grafted polypropylene and an amount of about 12 to 18 wt %, or particularly an amount of about 13 to 17 wt % of the glass fiber, based on the total weight of the composition.

The polypropylene (PP) having maleic anhydride (MAH) grafted to the end group may be a component added for securing impact stiffness of the penetration cover, and may improve impact resistance properties at a low temperature and room temperature by bonding a functional group of maleic anhydride (MAH) represented by the following Chemical Formula 1 to the end group of polypropylene (PP), and thus, may decrease a mixing amount of the glass fiber (GF) which causes a dielectric loss.

[Chemical Formula 1]

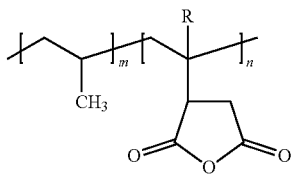

When a mixing amount of polypropylene (PP) having maleic anhydride (MAH) to the end group is less than the range suggested, the effect of improving impact resistance properties due to the addition of polypropylene (PP) having maleic anhydride (MAH) to the end group may not be sufficient, and when the mixing amount is greater than the range suggested, a thermal deflection temperature may be decreased.

The glass fiber (GF) may be a reinforcing filler added for preventing damage such as bending change. When the mixing amount is less than the range suggested, a stiffness improvement effect due to the addition of the glass fiber (GF) may not be sufficient, and when the mixing amount is greater than the range suggested, a dielectric loss may be increased and the content of the additive for improving impact resistance properties may be relatively decreased, thereby deteriorating impact resistance properties.

Meanwhile, depending on the type of detailed components of the glass fiber (GF) and the content thereof, the dielectric constant and the dielectric loss properties may vary.

Preferably, the components forming the glass fiber (GF) and the contents thereof may suitably be adjusted in order to maintain excellent properties of a dielectric constant and a dielectric loss.

For example, a glass fiber may suitably include an amount of about 55 to 75 wt % of $SiO_2$; an amount of about 15 to 25 wt % of $B_2O_3$; and an amount of about 1 to 25 wt % of metal components based on the total weight of the glass fiber. Preferably, the glass fiber may include an amount of about 60 to 75% of $SiO_2$ may be included and an amount of about 16 to 24% of $B_2O_3$.

The metal components may suitably include one or more components selected from the group consisting of $Al_2O_3$, CaO, MgO, $Li_2O$, $Na_2O$, $K_2O$, $TiO_2$, and $Fe_2O_3$. Further, when $Al_2O_3$ is used as the metal components, the content thereof may be about 7 wt % or less based on the total weight of the glass fiber.

As the content of $B_2O_3$ is increased, then the contents of $SiO_2$ and $Al_2O_3$ are decreased. When the content of $Al_2O_3$ is greater than the range suggested or the content of $B_2O_3$ is less than the range suggested, the dielectric constant and the dielectric loss may be increased.

Carbon black may improve light fastness, and when the mixing amount is less than the range suggested, the composition may be vulnerable to UV absorption so that light fastness may be decreased, and when the mixing amount is greater than the range suggested, the dielectric constant and the dielectric loss may be increased.

Meanwhile, since carbon black influences performance depending on a particle size, carbon black may suitably have a particle size of about 20 to 40 nm.

When the size of the carbon black is less than the range suggested, excellent dielectric properties may be maintained, but an agglomeration phenomenon upon injection may occur so that distortion of a radar beam pattern in the penetration cover may occur. Further, when the size of the carbon black is greater than the range suggested, a UV reflectance may decrease so that light fastness may be deteriorated.

Example

The present invention will be described by the Comparative Examples and the Examples.

Specimens having varied types and contents of a main material and an additive were manufactured, and a dielectric constant, a dielectric loss, an IZOD impact strength, a Ball drop test, and an HDT thermal deflection temperature were evaluated.

The types and the contents of the main material and the additive were changed as shown in FIG. 1, and the evaluation results are shown together in FIG. 1.

Here, as the glass fiber (GF) used as the additive, a glass fiber including 73.5 wt % of $SiO_2$; 23 wt % of $B_2O_3$; and 3.5 wt % of metal components, based on the total weight of the composition, was used.

Further, the dielectric constant and the dielectric loss were evaluated according to the standards of ASTM D2520 and JISC256, and the official experiment title is Standard Test Methods for Complex Permittivity (dielectric Constant). The specimen was manufactured into a sample having a size of 3×10×30 mm, placed in a metal empty place, and measured a variance in resonance frequency to measure the dielectric constant and the dielectric loss.

The IZOD impact strength was evaluated according to the method defined in ISO 180 (Plastics-Determining of Izod impact strength), Type A. However, the size of the specimen was 80×10×4 mm and a notched specimen was used. Evaluation was performed by measuring 7 or more specimens and indicating an arithmetic mean value of five values excluding the upper limit and the lower limit.

The ball drop test evaluation (impact resistance test) was performed by installing a test product which is mounted in a normal use condition with an effective surface being almost parallel with an upper side, free-falling a falling hammer to apply defined impact energy, and observing occurrence of destruction, deformation, and the like. In principle, the falling hammer had a ball head having a radius of 25 mm, a rigid body having a mass of 0.5 kg was used as the falling hammer, and the evaluation was performed at an impact energy of 15 kg·cm and a test temperature of room temperature and at a temperature of −30° C. Then, the number of tests was three or more, and after the evaluation, when there was no defect which influences the appearance such as breakage, crack, and deformation, the specimen was determined to pass (OK), and when there were defects which influence the appearance such as breakage, crack, and deformation, the specimen was determined to fail (NG).

The HDT thermal deflection temperature evaluation was performed according to the method defined in ISO 75 (Plastics-Determination of temperature of deflection under load). However, the size of the specimen was 80×10×4 mm and a stress load was 1.82 MPa. In addition, it was performed according to the method defined in ASTM D 648 (Standard Test Method for Deflection Temperature of Plastics Under Flexural Load in the Edgewise Position). However, the size of the specimen was 127×12.7×6.4 mm and a stress load was 0.45 MPa. Then, the test was performed by measuring 5 or more specimens and indicating the average value.

Meanwhile, the composition according to the present invention is a composition forming a radar penetration cover of a vehicle, and it is preferred that the composition has a dielectric constant of 3.1 or less, a dielectric loss of 0.008 or less, an impact strength of 8 KJ/m$^2$ or more, and a HDT thermal deflection temperature of 140° C. or greater, and pass (OK) the ball drop test evaluation.

In addition, impact resistance is very important for having a larger area of the penetration cover and securing a degree of arrangement freedom for improving detection performance. Therefore, as shown in FIG. 1, though ASA was added to specimen No. 4 which is a conventional material for increasing impact stiffness, but the impact resistance properties required in the IZOD impact strength and the ball drop test were not satisfied. In addition, it was confirmed that the dielectric loss was deteriorated by an acryl rubber in ASA.

However, it was confirmed that specimens Nos. 1 to 3 in which an additive was added to a main material including PBT and PC except ASA and PET according to the exemplary embodiment of the present invention had excellent dielectric properties and also secured impact resistance. In particular, it was confirmed that impact stiffness was significantly increased and low dielectric properties were secured by adding PP having MAH grafted to the end group as the additive.

However, specimen No. 5 which included PBT and PC except ASA and PET as the main material but had no additive had excellent dielectric properties, but did not satisfy the impact resistance properties.

Further, though PP having MAH grafted to the end group was used as the additive, in the case of specimen No. 6 which had the small mixing amount thereof, the dielectric properties were secured, but the impact strength was lowered, and product deformation/cracks occurred in the ball drop test under a low temperature (−30° C.) atmosphere, and thus, specimen No. 6 was inappropriate for use as the penetration cover.

However, in the case of specimen No. 7 in which PP having MAH grafted to the end group was used as the additive, but the mixing amount was large, the dielectric properties and the impact resistance properties were excellent, but the HDT thermal deflection temperature to be required was not satisfied.

Further, specimen No. 8 in which an EPDM rubber was used as the additive for securing impact resistance did not satisfy the IZOD impact strength and the ball drop test.

In addition, specimen No. 9 in which a glycidyl methacrylate end group was added to ethylene butyl acrylate was able to secure impact stiffness, but did not have low dielectric properties to be required, and thus, did not secure radar detection performance.

Next, influence of the detailed components of the glass fiber (GF) and the particle size of carbon back which were used as the additive on the characteristics of the penetration cover was evaluated.

Thus, the detailed components of the glass fiber (GF) and the content and the particle size of carbon black were changed with the contents of PBT, PC, MAH-grafted PP, and the glass fiber (GF) being fixed, thereby manufacturing a specimen, and the dielectric constant, the dielectric loss, the IZOD impact strength, the ball drop test, the HDT thermal deflection temperature, and the light fastness were evaluated.

The detailed components of the glass fiber (GF) and the content and the particle size of carbon black were changed as shown in FIG. 2, and the evaluation results are shown together in FIG. 2.

Here, light fastness evaluation was performed at 1,050 KJ/m$^2$ [340 nm], a black panel temperature of 90° C., a chamber internal moisture of 50% RH, and an irradiation illuminance of 0.55±0.02 W/(m$^2$·nm) [340 nm], using xenon arc. However, the filter was formed of a combination of borosilicate (inner filter) and soda lime (outer filter) and continuously irradiated. When the evaluation overlapped a test method by carbon arc having other specifications, the evaluation was performed according to a xenon arc test method. Thus, the specimen was determined to pass (OK) only when there occurs no discoloration, fading, or stickiness (additive elution), and was determined to fail (NG) when there occurs discoloration, fading, or stickiness (additive elution). Here, gray scale was third grade or higher and ΔE* was 2 or less. Gray scale means that as the grade is lower, difference in brightness meaning black and white as compared with the conventional color is larger, and ΔE* means that as the value is higher as a concept of color difference, color change as compared with the conventional color is larger.

As confirmed in FIG. 2, the detailed components of the glass fiber (GF) and the content and particle size of carbon black are applied according to the exemplary embodiment of the present invention. It was confirmed that specimens Nos. 10 to 12 had excellent dielectric properties and also secured impact resistance. Further, it was confirmed that evaluation for the thermal deflection temperature and the light fastness was excellent.

However, specimen No. 13 in which the detailed components of the glass fiber (GF) satisfied the components and contents suggested in the present invention, but the particle size of carbon black was smaller than the range suggested, had excellent dielectric properties, but did not secure dispersibility upon injection and agglomerated. Thus, there occurred a phase difference in a radar beam route between an area where carbon black agglomerated and an area where carbon black did not agglomerate, and thus, distortion of a radar beam pattern occurred. This means that since correct radar detection performance was not implemented, the specimen may not be used as a radome material.

In addition, it was confirmed that specimen No. 14 in which the detailed components of the glass fiber (GF) satisfied the components and contents suggested in the present invention, but the particle size of carbon black was larger than the range suggested, had a lowered UV reflectance and did not satisfy light fastness evaluation.

Further, it was confirmed that specimens Nos. 15 to 18 in which the contents and particle sizes of carbon black satisfied the range suggested in the present invention, but the detailed components of glass fiber (GF) did not satisfy the components and the contents suggested in the present invention, had increased dielectric constant and dielectric loss, and thus, did not satisfy the requirements.

In addition, specimens Nos. 19 to 22 in which the detailed components of the glass fiber (GF) satisfied the components and contents suggested in the present invention and the particle size of carbon black satisfied the range suggested in the present invention, but the content of carbon black was higher than the range suggested in the present invention, had increased dielectric constant and dielectric loss, and thus, did not satisfy the requirements.

Further, it was confirmed that specimen No. 23 in which the detailed components of the glass fiber (GF) satisfied the components and the contents suggested in the present invention and the particle size of carbon black satisfied the range suggested in the present invention, but the content of carbon black is lower than the range suggested in the present invention, was able to secure the dielectric properties, but was vulnerable to UV absorption to have insufficient light fastness.

According to an exemplary embodiment of the present invention, polypropylene (PP) having maleic anhydride (MAH) grafted to an end group is mixed for decreasing a mixing amount of a glass fiber which is added to the composition for improving mechanical physical properties, and the mixing amount thereof is adjusted, thereby improving dielectric properties while maintaining excellent mechanical physical properties such as impact resistance of the penetration cover.

In addition, in forming the glass fiber added to the composition, a mixing amount of $SiO_2$ and $Al_2O_3$ which are main components of the glass fiber is decreased, and a mixing amount of $B_2O_3$ is increased, thereby decreasing a dielectric constant and a dielectric loss of the penetration cover.

Further, a content and a size of carbon black to be added to the composition are adjusted, thereby preventing a distortion phenomenon of a radar beam pattern while securing the dielectric properties of the penetration cover.

Although the present invention has been shown and described with respect to various exemplary embodiments, it will be apparent to those having ordinary skill in the art that the present invention may be variously modified and altered without departing from the spirit and scope of the present invention as defined by the following claims.

What is claimed is:

1. A composition for a radar penetration cover of a vehicle, comprising:
   an amount of about 60 to 70 wt % of polybutylene terephthalate (PBT),
   an amount of about 10 to 20 wt % of polycarbonate (PC), and
   an amount of about 11.5 to 27.8 wt % of an additive comprising i) polypropylene (PP) having maleic anhydride (MAH) grafted to an end group and ii) a glass fiber (GF),
   wt % based on the total weight of the composition.

2. The composition for a radar penetration cover of a vehicle of claim 1, wherein the additive further comprises iii) carbon black.

3. The composition for a radar penetration cover of a vehicle of claim 2, wherein the additive comprises:
   an amount of about 1.5 to 7.5 wt % of the polypropylene (PP) having maleic anhydride (MAH) grafted to the end group;
   an amount of about 10 to 20 wt % of the glass fiber (GF), and
   an amount of about 0.15 to 0.3 wt % of carbon black,
   wt % based on the total weight of the composition.

4. The composition for a radar penetration cover of a vehicle of claim 1, wherein the glass fiber (GF) comprises:
   an amount of about 55 to 75 wt % of $SiO_2$;
   an amount of about 15 to 25 wt % of $B_2O_3$; and
   an amount of about 1 to 25 wt % of metal components,
   % based on the total weight of the glass fiber.

5. The composition for a radar penetration cover of a vehicle of claim 4, wherein the metal components comprise one or more components selected from the group consisting of $Al_2O_3$, CaO, MgO, $Li_2O$, $Na_2O$, $K_2O$, $TiO_2$, and $Fe_2O_3$.

6. The composition for a radar penetration cover of a vehicle of claim 5, wherein when the metal components comprises the $Al_2O_3$, a content of the $Al_2O_3$ is 7 wt % or less based on the total weight of the glass fiber.

7. The composition for a radar penetration cover of a vehicle of claim 2, wherein the carbon black has a size of about 20 to 40 nm.

8. A radar penetration cover of a vehicle, comprising a composition of claim 1.

9. A vehicle comprising a radar penetration cover of claim 8.

* * * * *